G. L. GEARHART & N. W. HOFFMAN.
BAND-CUTTER AND FEEDER FOR THRASHING-MACHINES.
No. 172,419. Patented Jan. 18, 1876.
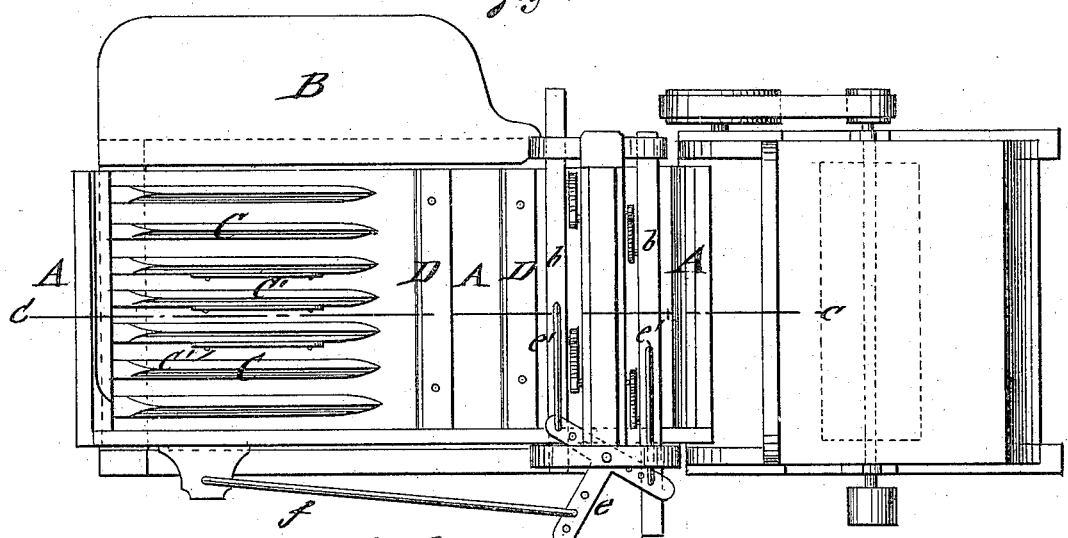
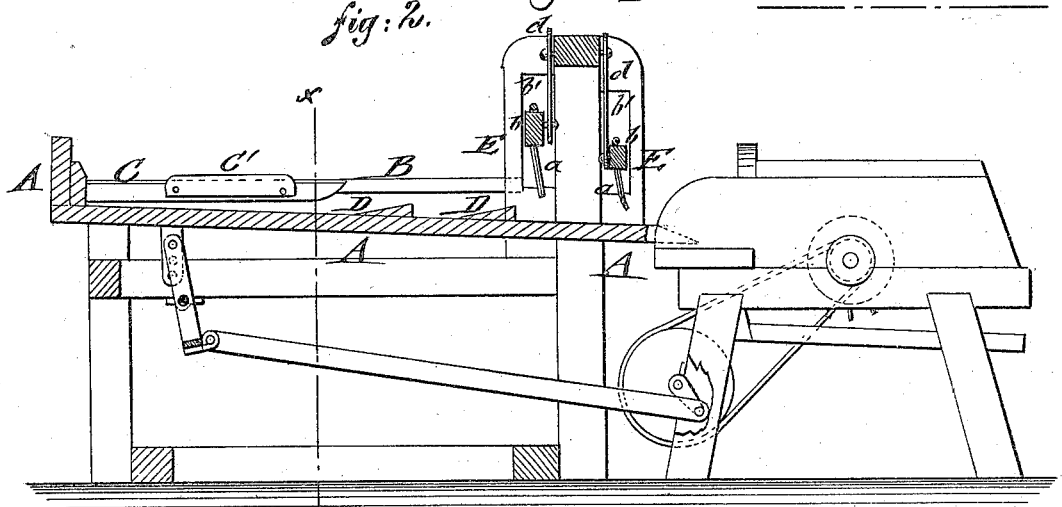
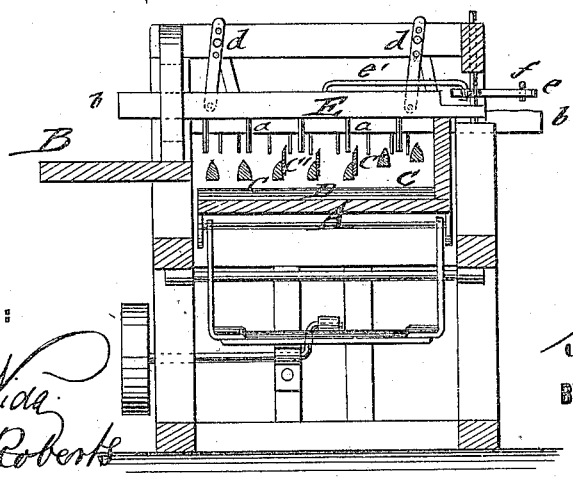

UNITED STATES PATENT OFFICE.

GODFREY L. GEARHART AND NICHOLAS W. HOFFMAN, OF LEBANON, N. J.

IMPROVEMENT IN BAND-CUTTERS AND FEEDERS FOR THRASHING-MACHINES.

Specification forming part of Letters Patent No. 172,419, dated January 18, 1876; application filed November 13, 1875.

*To all whom it may concern:*

Be it known that we, GODFREY L. GEARHART and NICHOLAS W. HOFFMAN, of Lebanon, in the county of Hunterdon and State of New Jersey, have invented a new and Improved Automatic Feeder for Thrashing-Machines, of which the following is a specification:

In the accompanying drawing, Figure 1 represents a top view; Fig. 2, a vertical longitudinal section on the line $cc$, Fig. 1; and Fig. 3, a vertical transverse section on the line $xx$, Fig. 2, of our improved automatic feeding apparatus for thrashing-machines.

Similar letters of reference indicate corresponding parts.

Our invention relates to an automatic feeding apparatus for thrashing-machines, by which the sheaves are readily and evenly cut, spread, and conveyed to the thrasher without an attendant; and the invention consists, mainly, of a reciprocating shaker with a side shelf, from which the sheaves are pushed on stationary fingers, arranged concavely with cutting-knives to cut the bands. The stalks are dropped through the fingers and pushed forward by one or more lateral steps or strips of the shaker, to be then evenly distributed by one or more laterally-vibrating rakes, and conveyed to the thrasher.

In the drawing, A represents a shaker of suitable size, that is supported on a frame at the height of the mouth or feed-opening of the thrashing-machines in general use, reciprocating motion being imparted to the shaker by suitable lever and crank connection with the driving-shaft of the thrasher. The shaker A is reciprocated in slightly-inclined position, with its tapering forward end sliding on the feed-board of the thrasher, so that by the motion of the shaker the stalks are readily moved forward over the same toward the thrasher. A slightly-inclined shelf or feed-board, B, is arranged at one side of the shaker A, so that the sheaves placed thereon push each other, one after the other, on the shaker. To the end wall of the shaker, next to the shelf, are fastened stationary fingers C, which extend parallel to the longitudinal axis of the shaker at about the length of the stalks. The central fingers C are placed somewhat lower than the outer fingers opposite to feed-shelf B, so that the fingers form a basket or dish of slight concavity, for the purpose of throwing the sheaves pushed thereon readily back over the middle fingers. One or more of the middle fingers C are provided with sharp cutting-knives C', that extend above the top edge of the fingers, and serve to cut the bands of the sheaves by the motion imparted to them by the shaker. As soon as the band of the sheaf is cut, the stalks drop between the sharp-edged fingers to the bottom of the shaker, and are gradually fed forward by the same. One or more lateral steps or strips, D, are applied to the shaker at suitable distance in front of the fingers, and made in such a manner that the stalks pass readily over the inclined top of the same, but are then taken hold of by the vertical part of the steps, to be thereby pushed forward toward the distributing-rakes E. One or more distributing-rakes, E, may be provided, two, however, being preferable, one having teeth at somewhat greater distance than those of a second rake, in which the teeth are closer together. The teeth $a$ are applied at suitable inclination away from the direction of motion of the stalks, for the purpose of interfering as little as possible with the forward motion of the same. The teeth are set into cross-pieces $b$, which are guided in recesses $b'$ of the supporting-frame, and hung to adjustable swinging rods $d$. The rakes E are vibrated by a fulcrumed T-piece, $e$, which is connected at the ends equidistant from the central arm by pivot-rods $e'$ to the cross-bars $b$ of the rakes, while the end of the central arm of the piece is connected, by a pivot-rod, $f$, with the shaker, so that the greater or lesser speed of the shaker controls the corresponding vibrations of the rakes. The T-piece is perforated at its arms to admit the adjustment of the connecting pivot-rods, and thereby the larger or smaller length of the lateral vibrations, according to the stalks to be fed.

The first rake E is placed higher than the second rake, and provided with longer teeth, for the purpose of making the first general distribution of the stalks, which are then further equalized by the alternately-vibrating second rake, that arranges the stalks in a layer of uniform thickness, and conveys them thus to the mouth of the thrasher.

The automatic cutting, feeding, and distributing of the sheaves and stalks by this apparatus accomplishes the work with greater regularity and evenness than by hand, admits therefore of a quicker working of the thrasher, and dispenses with the hands hitherto required for feeding the sheaves, which is, on account of the unhealthy and injurious influence of the dust produced by the thrasher, a great advantage. The apparatus requires merely a sufficient supply of sheaves to the shaker to attend to the feeding in regular and automatic manner at the speed required.

Having thus described our invention, we claim as new and desire to secure by Letters Patent—

1. The shaker of an automatic feeder for thrashing-machines, being provided with a series of stationary fingers, arranged concavely or dishing, to throw sheaves toward the center, substantially as set forth.

2. The middle fingers of the shaker, made with upward-projecting knives, for cutting the bands of the sheaves resting on the fingers, substantially as set forth.

3. The feeding-shaker, having one or more lateral pushing-strips in front of the fingers to feed the stalks to the distributing-rakes, substantially as described.

4. The combination of a laterally-vibrating rake, having inclined teeth at a distance from each other, with a vibrating rake, whose teeth are placed nearer together and lower than those of the first rake, to produce the even distributing of the stalks for being fed to the thrasher, substantially in the manner and for the purpose set forth.

GODFREY L. GEARHART.
NICHOLAS W. HOFFMAN.

Witnesses:
PAUL GOEPEL,
T. B. MOSHER.